United States Patent Office 3,579,604
Patented May 18, 1971

3,579,604
ISOMERIZATION OF OCTALINS
Anthony L. Tumolo, Havertown, Pa., assignor to
Sun Oil Company, Philadelphia, Pa.
No Drawing. Filed Apr. 27, 1970, Ser. No. 32,363
Int. Cl. C07c *13/08*
U.S. Cl. 260—666      4 Claims

ABSTRACT OF THE DISCLOSURE

An octalin is isomerized to another octalin, in particular 1,9-octalin to 9,10-octalin, by contact, preferably in a nonaqueous system, with strongly acidic ion exchange resin having a macroporous structure.

BACKGROUND OF THE INVENTION

There are six known octalins, namely, (1) 9,10-octalin, (2) 1,9-octalin, (3) trans-1,2-octalin, (4) cis-1,2-octalin, (5) trans-2,3-octalin, and (6) cis-2,3-octalin.

Liquid mixtures of octalins are produced in various ways, such as by the dehydration of 2-decalol. Various procedures for such dehydration are disclosed in articles by authors in publications as follows: W. P. Campbell et al., J. Am. Chem. Soc., 63, 2721 (1941); W. G. Dauben et al., J. Org. Chem., 23, 1205 (1958); and A. S. Hussey et al., J. Org. Chem., 26, 256–257 (1961).

In the latter will be noted the observation that the data for the acid-catalyzed equilibration of the 1,9-octalin and 9,10-octalin (e.g., with phosphoric acid) suggest that the apparent enrichment of 9,10-octalin is more likely the result of removal of the 1,9-octalin due to polymerization side reactions.

Equilibration of octalin mixtures using various other acidic reagents is dealt with in an article by J. W. Powell et al., Proc. Chem. Soc., p. 412 (1960). Also equilibration of octalins is dealt with in an article by P. Oberhänsli et al. in J. Chem. Soc. (B), pp. 467–471 (1969).

Another procedure for the production of octalin mixtures involves the dehydrohalogenation of monohalodecahydronaphthalene. Production of the latter is disclosed in United States Pat. 2,629,748, issued Feb. 24, 1953, to F. E. Condon, and the product can be subjected to dehydrohalogenation by known procedures to yield octalin mixtures.

In such mixtures, 9,10-octalin and 1,9-octalin usually predominate, (the former considerably over the latter), with at least some of the other octalins being present.

A very desirable octalin is 9,10-octalin, since it can be converted to sebacic acid by oxidation and reduction. An oxidation reaction is set forth in an article by W. Hückel et al. in Ann., 474, p. 125 (1929), to yield δ-ketosebacic acid which by use of the Clemmenson reduction can be converted to sebacic acid.

Sebacic acid is useful, among other things, in the manufacture of synthetic resins of the alkyd or polyester type, of nonmigrating plasticizers, of polyester rubbers and of synthetic fibers of the polyamide type.

The distinction between conventional ion exchange resins and those of macroreticular structure is dealt with in a publication entitled, "Resin Review," published by Rohm and Haas Company, Independence Mall, Philadelphia, Pa., vol. XII, No. 3, p. 2, summer 1962.

Isomerization of open-chain olefins with macroreticular ion exchange resins is known, but not without very substantial polymerization of olefinic material, with unwanted large loss of potential isomerized product.

SUMMARY OF THE INVENTION

The present invention is based upon the isomerization of an octalin to another octalin, for example, the isomerization to 9,10-octalin of octalin other than 9,10-, such as 1,9-octalin, without any significant loss of octalin by polymerization. The process involves treating, preferably in a nonaqueous system, an octalin material containing other than 9,10-octalin, (which may or may not also be present in the starting material, if so in less than equilibrium concentration), with a strongly acidic ion exchange resin of macroporous structure, to yield an octalin product containing 9,10-octalin in enriched concentration.

DESCRIPTION

Ion exchange resins are classed into categories relating to functional groups, of which those falling into the category "strongly acidic" are readily identified. Typical of these are the sulfonated polymer products. Macroporous ion exchange resins also are readily identified. These resins have pores of a considerably larger size than those of the more conventional gel-type resin. Resin particles having this macroporous or macroreticular structure possess a high degree of true porosity, that is, the pores are rigid in character and relatively fixed within the resin beads. Typically, their structure can be seen quite clearly with the aid of an electron microscope, showing pore diameters of up to several thousand angstroms. Strongly acidic ion exchange resins of macroporous structure are exemplified by a highly acidic ion exchange resin of sulfonated type sold commercially under the proprietary name "Amberlyst 15." It has an average pore diameter of 200 to 600 angstroms, and it is a styrene-divinylbenzene copolymer with sulfonic acid group sites.

In the present process the octalin feed is contacted with the strongly acidic ion exchange resin having macroporous or macroreticular structure, the resin functioning as the isomerization catalyst. Contacting of the feed with the resin catalyst can be carried out in any suitable apparatus such as a batch reactor, a fixed bed column, or a continuous contactor.

Separation of the reaction mixture from the catalyst can be accomplished by simple filtration. Separation of product octalin from the reaction mixture can be accomplished such as by distillation (e.g., at reduced pressure), whereupon unconverted feed octalin thus recovered can be, if desired, treated anew, e.g. recycled, with further production of isomerized octalin. Separations are, of course, made in vapor phase chromatography, even though on a limited scale. The above-mentioned articles by W. G. Dauben et al. and by A. S. Hussey et al. set forth procedure for separating 9,10-octalin from an octalin mixture through treatment to yield the nitroso chloride derivative of the 9,10-isomer which, after separation, is processed to yield, through regeneration, the olefin in virtually pure form.

The process can be carried out at any desired pressure, atmospheric, above or below. Moreover, in view of the tendency of olefins to oxygenate in air, air preferably is excluded, such as by the use of an inert atmosphere, e.g., of nitrogen, or of at least a closed container, to avoid or reduce possible significant reaction with oxygen. This may not be found necessary in all instances, but is much preferred. Elevated pressure conditions can be required to maintain liquid phase reaction conditions under elevated temperature conditions.

Time, temperature and percent of catalyst are in themselves not particularly critical, and have more or less a normal relationship in that time of reaction is decreased with increase in temperature and/or percent of catalyst, and vice versa, each preferably having a value high enough for practical purposes, as is well understood. Also as is well understood, temperature conditions preferably should not be so high nor time of reaction so long as to be destructive of catalyst, reactants and/or product.

To illustrate, temperature conditions during reaction can be room temperature, above or below, e.g., 0° C. to 150° C. and particularly 0° C. to 110° C., consideration being given to the volatility of substances present in the reaction zone, such as solvent, which can require increase in pressure to maintain liquid phase. For practical purposes 20° C. to 75° C. is a good temperature range.

While the ratio of catalyst to octalin starting material can vary rather widely, the range of 0.1 to 1 by weight is within practical limits, and particularly 0.3 to 0.8.

The use of a solvent for the octalin in the reaction zone is advantageous as shown by specific examples presented hereinafter, but such use is not absolutely necessary. Useful solvents are characterized by ability to dissolve octalins and inertness for practical purposes in the reaction zone under the conditions of reaction. Examples of types of solvents which can be used are aromatics, paraffins, cycloparaffins or mixtures of such hydrocarbons with oxygenated polar solvents such as lower aliphatic acids, alcohols, esters and ethers. Particularly suitable solvents are mixtures of aromatic hydrocarbons, such as benzene, toluene and xylenes, with polar solvents such as acetic acid, propionic acid, methanol, ethanol, isopropanol, ethyl acetate, methyl formate, methyl propionate, dioxane, tetrahydrofuran, diethyl ether, methylbutyl ether and the like.

The term "nonaqueous" when used to describe conditions within the reaction zone, is to be construed in a practical sense, for absolute anhydrous conditions are difficult to attain and maintain industrially. Thus when such conditions are specified, the reaction zone is "nonaqueous for practical purposes," which indicates a tolerance for water short of a visible separate phase.

Octalin mixtures obtained by various methods frequently contain small amounts of inert decahydronaphthalene, hereinafter referred to as "DCHN." Such DCHN can serve as an internal standard for vapor phase chromatographic analysis. If the feed does not contain any DCHN, then a small amount of DCHN, or or dodecane or other inert material, can be added for this purpose. In the practice of the invention, the internal standard concentrations do not increase significantly, which shows that there is no significant loss of octalins by side reactions, such as by polymerization to nonvolatile polymer.

The following examples are given by way of illustration.

EXAMPLE I

An octalin mixture (analysis given in Table I below) in amount of 1.2 ml. was dissolved in 6 ml. of solvent containing 2 to 1 acetic acid to benzene by volume. 0.36 g. of a strongly acidic macroporous ion exchange resin sold commercially as "Amberlyst 15" was added, and the mixture stirred under an atmosphere of nitrogen at 75° C. for 2 hours, and then at room temperature for 7 hours. The yield of 9,10-octalin was 85.6% of the total octalins present, as can be seen in Table I below, the increase being up from 58.7%.

EXAMPLE II 1.2 ml. of the octalin mixture used in Example I was dissolved in 6 ml. of solvent containing 2 to 1 acetic acid to benzene. Then to stimulate conditions in a packed tower reactor, 2.0 ml. of the solutions was added to 1.44 g. of the abovementioned catalyst "Amberlyst 15," which was just enough solution to cover the catalyst. The reaction was carried out in a closed container and after 3 hours at room temperature, the yield of 9,10-octalin was 84.3%, up from 58.7%, as can be seen from Table I.

TABLE I.—OCTALIN ISOMERIZATIONS WITH SOLVENT

|  | Composition, weight percent | | | | | Percent of total octalins | | |
| --- | --- | --- | --- | --- | --- | --- | --- | --- |
|  | Trans-DCHN[1] | Cis-DCHN[1] | 9,10-octalin | 1,9-octalin | Other octalin | 9,10-octalin | 1,9-octalin | Other octalin |
| Starting mixture | 1.0 | 11.1 | 51.5 | 28.5 | 7.9 | 58.7 | 32.7 | 8.9 |
| Example I | 1.1 | 11.1 | 75.3 | 8.8 | 3.7 | 85.7 | 10.0 | 4.2 |
| Example II | 0.9 | 11.4 | 73.9 | 8.4 | 5.4 | 84.3 | 9.6 | 6.1 |

[1] DCHN = decahydronaphthalene.

EXAMPLES III AND IV

The data comprising Examples III and IV are shown in Table II. Analysis of the starting material is given, and the product composition for each of these examples is shown on the lines labeled "Example III" and "Example IV," respectively. These runs were made at room temperature with the reaction system under nitrogen. No solvent was present. The resin present was 30% by weight of octalins present. Dodecane was added to serve as an internal standard. "Amberlyst 15" again was used as the resin catalyst.

TABLE II.—OCTALIN ISOMERIZATIONS WITHOUT SOLVENT

|  |  | Composition, weight percent | | | | |
| --- | --- | --- | --- | --- | --- | --- |
|  | Time, hrs. | Trans-DCHN and unidentified octalin | 1,9-octalin and cis-DCHN | 9,10-octalin | Unidentified octalin | Dodecane (internal standard) |
| Starting mixture |  | 3.9 | 34.6 | 47.2 | 0.8 | 13.5 |
| Example III | 3 | 4.3 | 27.7 | 52.5 | 2.2 | 13.3 |
| Example IV | 5 | 3.3 | 26.3 | 54.8 | 2.2 | 13.3 |

The increases in 9,10-octalin yield in Examples I and II over Examples III and IV indicate that better results can be obtained by using a solvent.

The data of the above examples show that an enrichment of 9,10-octalin can be accomplished without significant loss of octalin to side reactions.

The invention as applied to mixtures of octalins as starting material, is applicable to such mixtures as are in other than a state of equilibrium, irrespective of the forward direction of the reaction. In the case of the production of 9,10-octalin, the concentration of the latter in the starting material can vary between zero and equilibrium under the condtions of reaction. Also the octalin to be isomerized may be a single octalin, or a mixture of octalins in which the octalin to be isomerized is present in greater than equilibrium concentration under the conditions of reaction, which was the case with 1,9-octalin, and "other octalins," in the above examples.

The invention claimed is:

1. A process for the isomerization of an octalin to another octalin which comprises contacting said first-mentioned octalin with strongly acidic ion exchange resin having a macroporous structure.

2. The process of claim 1 for preparing 9,10-octalin which comprises contacting a liquid octalin feed mixture comprising 1,9-octalin in greater than its equilibrium concentration and 9,10-octalin in less than its equilibrium concentration with said strongly acidic ion exchange resin, and recovering an octalin product containing 9,10-octalin in enriched concentration.

3. The process of claim 2 wherein the reaction is carried out in a nonaqueous system.

4. The process of claim 3 wherein the reaction is carried out in the presence of solvent media for the reactants and products present.

References Cited

UNITED STATES PATENTS 3,424,810   1/1969   Suatoni _____ 260—683.C

OTHER REFERENCES

W. P. Campbell et al.: J. Am. Chem. Soc., 63, 2721 (1941).

W. G. Dauben et al.: J. Org. Chem., 23, 1205, 1958.

A. S. Hussey et al.: J. Org. Chem., 26, 256–259, 1961.

J. W. Powell et al.: Proc. Chem. Soc., p. 412, 1960.

P. Oberhansli et al.: J. Chem. Soc. (B) 4–67–471, 1969.

DELBERT E. GANTZ, Primary Examiner

V. O'KEEFE, Assistant Examiner